United States Patent [19]

Correll

[11] 4,008,838
[45] Feb. 22, 1977

[54] LADDER RACK

[76] Inventor: Richard R. Correll, 320 Escobar Road, Portola Valley, Calif. 94025

[22] Filed: May 30, 1975

[21] Appl. No.: 582,483

[52] U.S. Cl. .......................... 224/42.1 F; 182/127; 211/13; 224/42.38
[51] Int. Cl.² ........................................ B60M 9/04
[58] Field of Search ............... 224/42.1 R, 42.1 D, 224/42.1 E, 42.1 F, 42.1 G, 42.1 H, 42.4, 42.1 B, 42.1 C, 42.03 R, 42.07, 42.38, 42.45 R; 214/450; 296/3; 280/179 R; 248/503, 509, 305, 316 R, 316 B; 182/127, 93; 269/254 CS, 134, 135, 29 R; 211/5, 8, 13, 49 R, 60 R, 60 SK, 60 T, 89; 292/113; 267/70; 105/463, 464, 466

[56] References Cited

UNITED STATES PATENTS

| | | | |
|---|---|---|---|
| 1,498,831 | 6/1924 | Boyle | 224/42.4 |
| 2,134,823 | 11/1938 | Herrmann et al. | 248/509 |
| 2,237,853 | 4/1941 | Troche | 248/503 X |
| 3,251,519 | 5/1966 | Jones | 224/42.1 F |
| 3,826,390 | 7/1974 | Watson | 224/42.1 FX |
| 3,877,624 | 4/1975 | Carson | 224/42.1 F |
| 3,904,094 | 9/1975 | Correll | 224/42.1 F |

FOREIGN PATENTS OR APPLICATIONS 161,203 4/1953 Australia ................. 182/93

Primary Examiner—Robert J. Spar
Assistant Examiner—Winston H. Douglas
Attorney, Agent, or Firm—Townsend & Townsend

[57] ABSTRACT

A ladder rack for van-type vehicles is disclosed. The ladder rack includes a frame which overlies the roof of the vehicle and includes a transverse member which supports a ladder placed on the frame. A hook member is provided for securing the ladder to the frame. One end of the hook member is pivotably attached to the transverse member near the center of the transverse member. An intermediate downwardly concave portion of the hook member extends outwardly with respect to the vehicle and projects over one of the rails of the ladder on the frame when the hook member is pivoted downwardly. The opposite free end of the hook member projects downwardly between the rails of the ladder when the hook member is pivoted downwardly. A lever is provided to pivot the hook member downwardly from an upwardly raised released position to a ladder holding position with the intermediate portion biased against the rail of the ladder, and the hook member is locked in the ladder holding position to secure the ladder to the rack.

5 Claims, 6 Drawing Figures

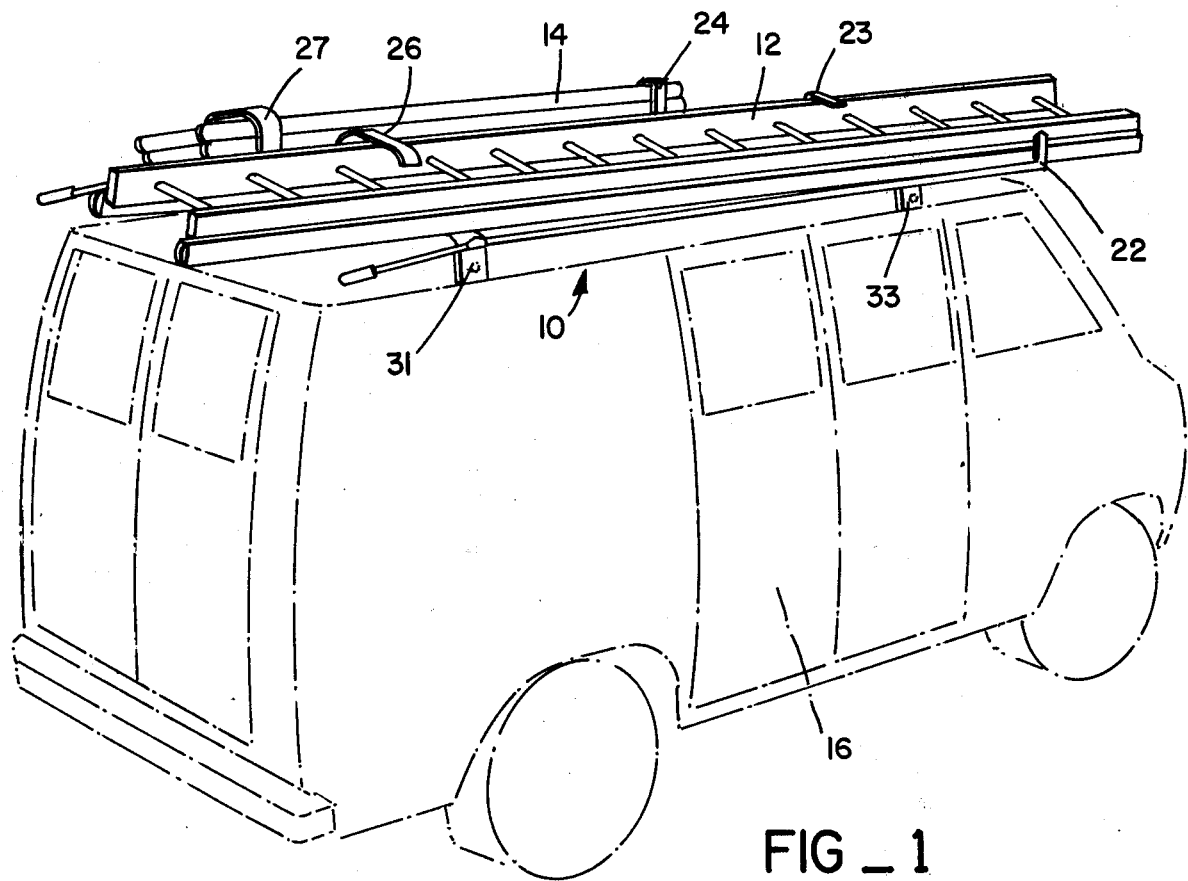
FIG_1
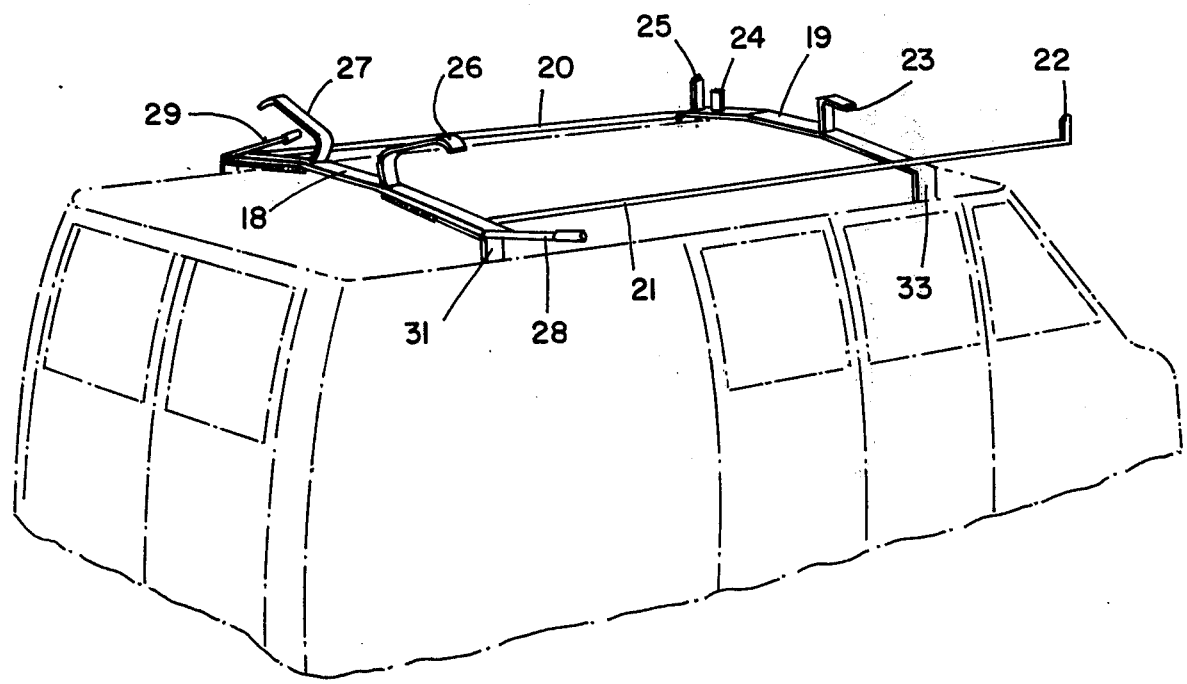
FIG_2

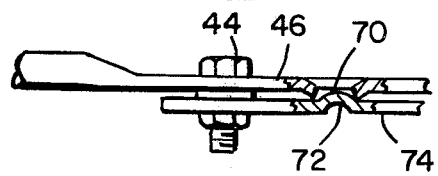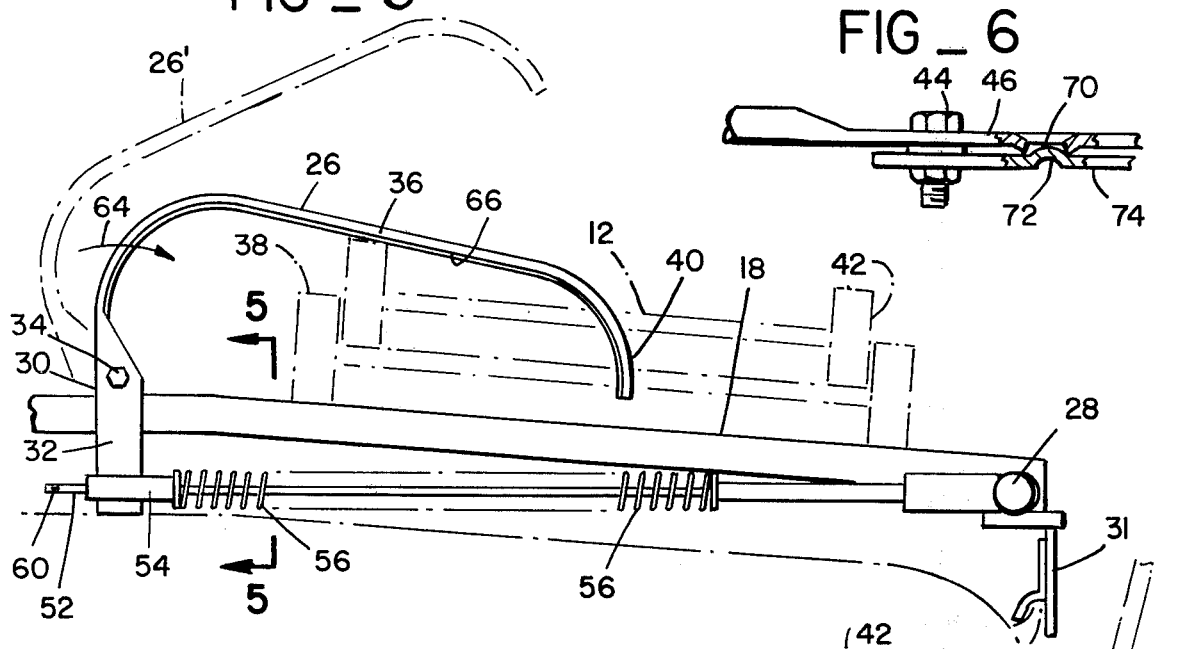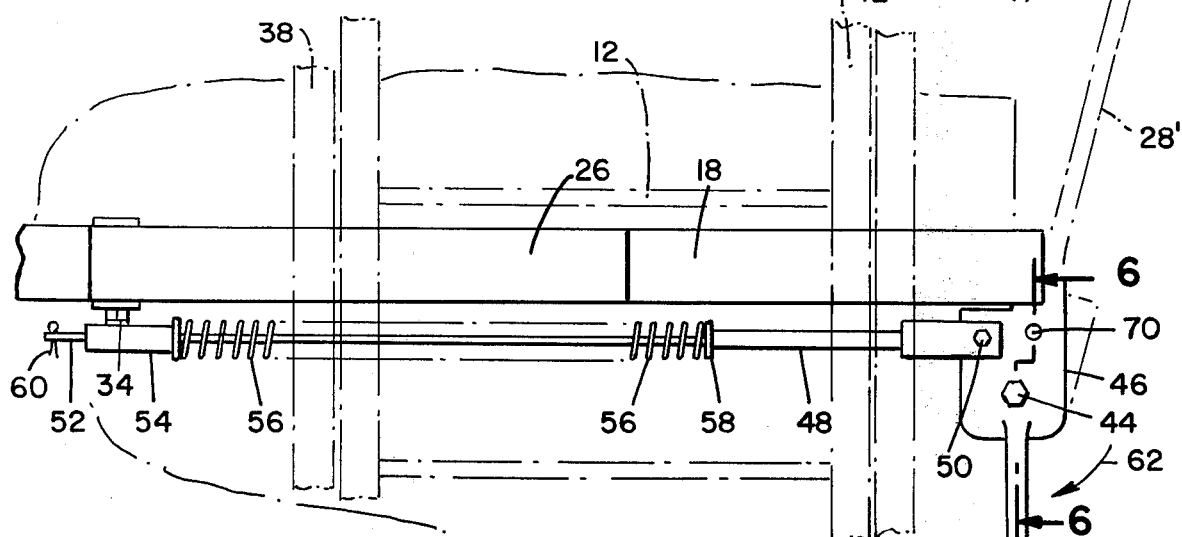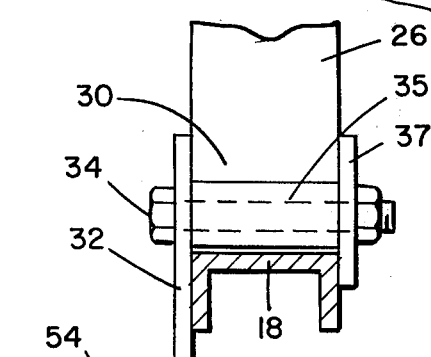

LADDER RACK

BACKGROUND OF THE INVENTION

The present invention relates to ladder racks for van-type vehicles, and in particular to apparatus for securing ladders to such racks.

A variety of ladder racks have been developed for van-type vehicles so that ladders can be carried over the roof of the van. At first such racks merely included a frame overwhich the ladders could be placed, and the ladders were secured in position with ropes or other tying means. A variety of ladder racks have since been developed which include a mechanism for securing the ladders to the rack as an integral part of the rack itself. The securing mechanism is ordinarily actuated by a lever which projects over the side of the van. Such securing mechanisms have been adequate in the past, but are not feasible with the new type of vans which employ a side door which slides along the van. The mechanism interferes with movement of the sliding door and it cannot be fully opened. Also, the securing mechanism on such ladder racks is usually located on the side of rack so that the ladder must be lifted upwardly over the mechanism before it can be slid off the frame. Even on racks which have the securing mechanism in the center, stops are provided on the side to hold the ladder in position in emergencies, and the ladders must be lifted over the stops. This was not a significant problem in the past, but recently more and more women are being employed to perform tasks requiring the use of ladders. Although fully capable of performing such tasks, the women are ordinarily shorter than their male counterparts and encounter difficulty in lifting the ladders up so that they can be slid off the frame.

SUMMARY OF THE INVENTION

The present invention provides a ladder rack for van-type vehicles having an improved mechanism for securing the ladders to the rack. The ladder rack includes a frame which overlies the roof of the vehicle and includes a transverse member which supports a ladder placed on the frame. A hook member is provided for securing the ladder to the frame. One end of the hook member is pivotably attached to the transverse member near the center of the transverse member. An intermediate downwardly concave portion of the hook member extends outwardly with respect to the vehicle and projects over one of the rails of the ladder on the frame when the hook member is pivoted downwardly. The opposite free end of the hook member projects downwardly between the rails of the ladder when the hook member is pivoted downwardly. A lever is provided to pivot the hook member downwardly from an upwardly raised release position to a ladder holding position with the intermediate portion biased against the rail of the ladder, and the hook member is locked in the ladder holding position to secure the ladder to the rack.

In the preferred embodiment of the present invention the lever is pivotably attached to the end of the transverse members so that it can be pivoted in a horizontal plane. A rod is provided having one end connected to the lever and another end slidably connected to the pivot end of the hook member. A spring has one end connected to the hook member and another end connected to the rod so that pivoting of the lever in the closure direction pivots the hook member downwardly from its release position to its ladder holding position, and further movement of the lever in that direction compresses the spring against the hook member to bias the intermediate portion of the hook member against the ladder. The lever moves to an over center position and is maintained in that position to lock the hook member against the ladder.

None of the components of the securing mechanism of the ladder rack of the present invention depend over the side of the van, and thus the ladder rack does not interfere with the use of sliding side doors found on newer vans. Also, the ladder is held in position by the hook member and the free end thereof projects between the rails of the ladder so that it will not be dislodged in an emergency, and no stops or other support members are required at the outer ends of the transverse member. Thus, the ladder does not have to be raised when it is removed from the frame, but can merely be slid off the side, greatly facilitating use of the ladder rack by persons of short stature.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a van-type vehicle carrying ladders utilizing the ladder rack of the present invention;

FIG. 2 is a perspective view similar to FIG. 1 showing the ladders removed;

FIG. 3 is a rear elevation view of a portion of the ladder rack of the present invention illustrating the hook member in detail;

FIG. 4 is a plan view of the apparatus shown in FIG. 3;

FIG. 5 is a fragmentary elevation view of the pivot end of the hook member;

FIG. 6 is a fragmentary elevation view of the pivot end of the lever.

DESCRIPTION OF THE PREFERRED EMBODIMENT

The use of the ladder rack 10 of the present invention to carry a pair of ladders 12, 14 on top of a van-type vehicle 16 is illustrated in FIG. 1. Ladders 12, 14 are supported in a side-by-side configuration in the direction of travel of vehicle 16. As more clearly illustrated in FIG. 2, the ladders are supported on a pair of transverse members 18, 19 extending the width of the vehicle and attached thereto at 31, 33. A pair of elongate members 20, 21 interconnect the ends of transverse members 18, 19 to provide a rigid frame. A pair of flanges 22, 23 on transverse member 19 prevent transverse movement of the forward end of ladder 12. Similarly, flanges 24, 25 prevent transverse movement of the forward end of ladder 14.

Ladders 12, 14 are secured to the frame provided by transverse members 18, 19 and elongate members 20, 21 by a pair of hook members 26, 27. Hook members 26, 27 are pivotably attached to transverse member 18 adjacent the center of the transverse member between the positions of ladders 12, 14. As will be illustrated in more detail hereinafter, hook members 26, 27 project outwardly with respect to van 16 over the interior rails of ladders 12, 14 placed on the frame. Hook members 26, 27 are actuated by levers 28, 29 as illustrated hereinbelow to move the hook members between their ladder hold-on positions illustrated in FIG. 1 to their upwardly pivoted release positions illustrated in FIG. 2 to release and secure the ladders.

The operation of one lever 28 in actuating its associated hook member 26 is illustrated in more detail by way of reference to FIG. 3. As illustrated therein, the pivot end 30 of hook member 26 has a flange 32 pivotably attached to transverse member 18 by bolt 34. Referring briefly to FIG. 5, bolt 34 passes through a sleeve 35 rigidly attached to transverse member 18 and engages a second flange 37 so that hook member 26 is pivotably attached to the transverse member. An intermediate portion 36 of hook member 26 is adapted to extend over the inside rail 38 of ladder 12. The end 40 of hook member 26 opposite from pivot end 30 of the hook member projects downwardly between the interior rail 38 and exterior rail 42 of ladder 12 when the hook member is in its downwardly pivoted position as illustrated.

The manner in which movement of lever 28 actuates hook member 26 is more fully illustrated by FIGS. 3 and 4 in combination. Lever 28 is pivotably attached to the outer end of transverse member 18 by vertical bolt 44 which allows the lever to pivot in a substantially horizontal plane. The pivot end of lever 28 comprises a flat plate 46. A transverse rod 48 is pivotably connected to plate 46 at a position spaced from the pivotal axis of the lever by bolt 50. The other end 52 of rod 48 passes through a collar 54 which is connected to flange 32. A spring 56 circumscribes a portion of rod 48 and has one end bearing against collar 54 and an opposite end bearing against a stop 58 fixed to the rod. A cotter pin 60 passes through the end 52 of rod 48 so that it cannot become disengaged with collar 54.

In FIGS. 3 and 4 the ladder hold-down position of hook member 26 and lever 28 is shown with the release positions thereof depicted in phantom and denoted 26', 28' respectively. When lever 28 is in its release position 28', spring 56 will be fully extended and collar 54 will be in abutment with cotter pin 60. Upon initiation of pivoting of lever 28 in its closure direction as depicted by arrow 62 from its release position 28', spring 56 will maintain its fully extended configuration and hook member 26 will be pivoted downwardly as depicted by arrows 64. When the underside of hook member 26 contacts the inside rail 38 of ladder 12, the pad 66 on the underside thereof will be compressed against the rail. After such compression of pad 66, further movement of lever 28 in direction 62 will compress spring 56 so that pressure is exerted on hook member 26, thus biasing the hook member against rail 38 of ladder 12. Upon complete rotation of lever 28, the attachment of rod 48 to plate 46 in an over center position with respect to pivot point 44 of the lever. In this position, a detent 70 in plate 46 engages a complementary projection 72 on a flat plate 74 provided at the end of transverse member 18 as illustrated in FIG. 6. Lever 28 is thus locked in position with hook member 26 biased against the inside rail 38 of ladder 12 to secure the ladder to the rack.

With lever 28 locked in its ladder hold-on position with spring 56 compressed, approximately 30 pounds of pressure is exerted on the inside rail 38 of ladder 12 to prevent it from sliding. Due to the design of hook member 26, a variety of ladders can be accommodated and engaged with the hook member. Also, in this position, the free end 40 of the hook member projects between the rails of the ladder so that the ladder cannot slide sideways in an emergency, thus alleviating the necessity for a stop at the outside ends of the transverse member as with previous devices. As a result, when lever 28 is pivoted in a horizontal plane to move hook member 26 to its release position 26', ladder 12 can easily be slid off the side of the rack and does not have to be lifted over the securing mechanism or any emergency stops.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What I claim as new is:

1. A ladder rack for a van-type vehicle comprising:
   a frame adapted to overlie the roof of the vehicle and including a transverse member adapted to at least partially support one or more ladders placed on the frame;
   means for mounting the frame to the roof of the vehicle;
   a hook member having a pivot end pivotably attached to the transverse member, an intermediate downwardly concave portion extending outwardly with respect to the vehicle and adapted to project over one of the rails of a ladder placed on said frame when the hook member is pivoted downwardly about said pivot end, and an opposite free end adapted to project downwardly between the rails of said ladder when said hook member is pivoted downwardly;
   a lever pivotably attached to an end of said transverse member;
   a rod generally parallel to the transverse member and having one end connected to the lever proximate said end of the transverse member and another end slidably connected to the pivot end of the hook member;
   a spring having one end connected to the hook member and another end connected to the rod so that pivoting of said lever in one direction moves the hook member from a release position to a ladder holding position and further movement of said lever in said one direction compresses the spring against the hook member to bias the hook member against the ladder; and
   means for locking the pivot means in the ladder holding position comprising means for maintaining the lever in an over center position with the hook member biased against the rail of the ladder.

2. A ladder rack for a van-type vehicle comprising:
   a frame adapted to overlie the roof of the vehicle and including fore and aft transverse members adapted to support one or more ladders placed thereon;
   means for mounting the frame to the roof of the vehicle;
   a hook member having a pivot and pivotably attached to one of the transverse members, an intermediate downwardly concave portion extending outwardly with respect to the vehicle and adapted to project over one of the rails of a ladder placed on said frame when the hook member is pivoted downwardly about said pivot end, and an opposite free end adapted to project downwardly between the rails of said ladder when said hook member is pivoted downwardly;

a lever pivotably attached to an end of said one transverse member;

a rod generally parallel to the transverse member having one end connected to the lever proximate said end of the transverse member and another end slidably connected to the pivot end of the hook member; and a spring circumscribing the rod and having one end connected to the hook member and another end connected to the rod so that pivoting of said lever in one direction pivots the hook member downwardly from an upwardly raised release position to a ladder holding position with the intermediate portion of the hook member against one of the rails of a ladder placed on the frame, and further movement of said lever in said one direction compresses the spring against the hook member to bias the intermediate portion of the hook member against the ladder.

3. A ladder rack as recited in claim 2 wherein said lever is movable in said one direction to an over center position, and additionally comprising means for maintaining said lever in said over center position to lock the hook member in the ladder holding position.

4. A ladder rack as recited in claim 3 wherein said one end of the transverse member includes a flat plate having a projection, and wherein the portion of the lever attached to said one end of the transverse member includes a planar portion overlying the plate and having a detent adapted to engage the projection in the plate when the lever is moved to the over center position.

5. A ladder rack for a van-type vehicle comprising:

a frame adapted to overlie the roof of the vehicle and including fore and aft transverse members adapted to support a pair of ladders in a side-by-side relationship;

means for mounting the frame to the roof of the vehicle;

a pair of hook members each having a pivot end pivotably attached to one of the transverse members intermediate the positions of the two ladders, said hook members each including an intermediate downwardly concave portion adapted to project outwardly over the inside rails of the respective ladders when the hook members are pivoted downwardly about their pivot ends, and an opposite free end adapted to project downwardly between the rails of the respective ladders when the hook members are pivoted downwardly; and means for actuating each of the hook members, said actuating means each comprising a lever pivotably attached to an end of said one transverse member, a rod generally parallel to the transverse member and having one end connected to the lever proximate said end of the transverse member and another end slidably connected to the pivot end of the hook member, a spring having one end connected to the hook member and another end connected to the rod, and means for maintaining the lever in an over center position so that movement of the lever in one direction toward the over center position pivots the associated hook member downwardly from an upwardly raised release position to a ladder holding position with the intermediate portion of the hook member against one of the rails of the associated ladder and further movement of the lever in said one direction to the over center position compresses the spring against the hook member to bias and lock the intemediate portion of the hook member against the ladder.

* * * * *